United States Patent
Dai et al.

(10) Patent No.: US 12,135,036 B2
(45) Date of Patent: Nov. 5, 2024

(54) CENTERBODY INSERTION FOR IMPROVED CAC MOTOR COOLING

(71) Applicant: Hamilton Sundstrand Corporation, Charlotte, NC (US)

(72) Inventors: Zhongtao Dai, West Hartford, CT (US); Ram Ranjan, West Hartford, CT (US); Kathryn L. Kirsch, East Haddam, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 46 days.

(21) Appl. No.: 18/075,159

(22) Filed: Dec. 5, 2022

(65) Prior Publication Data
US 2024/0183359 A1 Jun. 6, 2024

(51) Int. Cl.
*B64D 13/06* (2006.01)
*F04D 25/08* (2006.01)
*F04D 29/32* (2006.01)
*F04D 29/58* (2006.01)

(52) U.S. Cl.
CPC ......... *F04D 25/082* (2013.01); *F04D 29/321* (2013.01); *F04D 29/5806* (2013.01); *B64D 2013/0618* (2013.01); *B64D 2013/0644* (2013.01)

(58) Field of Classification Search
CPC ... F04D 19/002; F04D 29/5806; B64D 13/00; B64D 2013/0644; B64D 2013/0651; F02K 3/068
See application file for complete search history.

(56) References Cited

U.S. PATENT DOCUMENTS

| | | | |
|---|---|---|---|
| 1,932,231 A * | 10/1933 | Schmidt | F04D 19/002 417/369 |
| 2,191,341 A * | 2/1940 | Curley | F04D 19/002 415/222 |
| 2,494,772 A * | 1/1950 | Mcelroy | F04D 19/002 D23/413 |
| 5,133,194 A | 7/1992 | Army et al. | |
| 5,709,103 A | 1/1998 | Williams | |
| 9,638,199 B2 | 5/2017 | Beers et al. | |
| 10,065,219 B2 * | 9/2018 | Suzuki | A01G 20/47 |
| 10,265,707 B2 | 4/2019 | Himmelmann | |

(Continued)

FOREIGN PATENT DOCUMENTS

| | | | |
|---|---|---|---|
| EP | 3428069 A1 | 1/2019 | |
| GB | 1210202 A * | 10/1970 | F02C 7/047 |

OTHER PUBLICATIONS

Extended European Search Report for EP Application No. 23214049.1, dated Apr. 16, 2024, 5 pages.

*Primary Examiner* — Justin D Seabe
(74) *Attorney, Agent, or Firm* — Kinney & Lange, P.A.

(57) ABSTRACT

A ram air fan inlet assembly for cabin air compressor (CAC) motor cooling flow enhancement includes a gas path defined by a ram air duct and a fan section, a CAC motor cooling return duct having an outlet provided through a wall of the ram air duct, and a centerbody body disposed in the ram air duct. The fan section is disposed immediately downstream and abutting the ram air duct. The ram air duct and fan section share a common axis. The centerbody is disposed about the common axis and configured to reduce of volume of the gas flow path in the ram air duct. The centerbody and the outlet axially overlap.

19 Claims, 4 Drawing Sheets

(56) References Cited

U.S. PATENT DOCUMENTS

| | | | |
|---|---|---|---|
| 10,807,722 B2 * | 10/2020 | Himmelmann | B64D 13/06 |
| 10,968,827 B2 * | 4/2021 | Alecu | F02C 7/047 |
| 11,371,514 B2 * | 6/2022 | Suzuki | F04D 19/002 |
| 2014/0331692 A1 | 11/2014 | Eowsakul | |

* cited by examiner

CENTERBODY INSERTION FOR IMPROVED CAC MOTOR COOLING

BACKGROUND

The present disclosure relates generally to aircraft control systems and, more particularly, to cabin air compressor (CAC) motor cooling.

An air conditioning system for an aircraft cabin can include a CAC, which can be driven by an air-cooled electric motor. The CAC motor is cooled by a flow of cooling air drawn by a ram air system. The CAC draws air from the atmosphere through an impeller at a CAC inlet and provides a CAC motor cooling exhaust to a ram air system. The effectiveness of the CAC motor cooling is a function of a pressure differential between the CAC inlet and the ram air system. A higher pressure differential increases a mass flow rate through the CAC motor. Topology and shape optimization of internal and external passages of a CAC motor cooling exhaust duct and outlet has been successfully used to reduce CAC head loss and allow for more cooling flow to reach the CAC motor. However, additional reduction is desired to improve CAC motor cooling.

SUMMARY

In one aspect, a ram air fan inlet assembly for cabin air compressor (CAC) motor cooling flow enhancement includes a gas path defined by a ram air duct and a fan section, a CAC motor cooling return duct having an outlet provided through a wall of the ram air duct, and a centerbody body disposed in the ram air duct. The fan section is disposed immediately downstream and abutting the ram air duct. The ram air duct and fan section share a common axis. The centerbody is disposed about the common axis and configured to reduce of volume of the gas flow path in the ram air duct. The centerbody and the outlet axially overlap.

In another aspect, a method of enhancing cabin air compressor (CAC) motor cooling fluid flow in an aircraft includes positioning a centerbody in a ram air duct to reduce a volume of a gas flow path in the ram air duct and providing an outlet of a CAC motor cooling return duct through a wall of the ram air duct. The ram air duct abuts and is immediately upstream of a fan section, and the centerbody, ram air duct, and fan section are disposed about a common axis. The centerbody and the outlet axially overlap.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Figure 1:
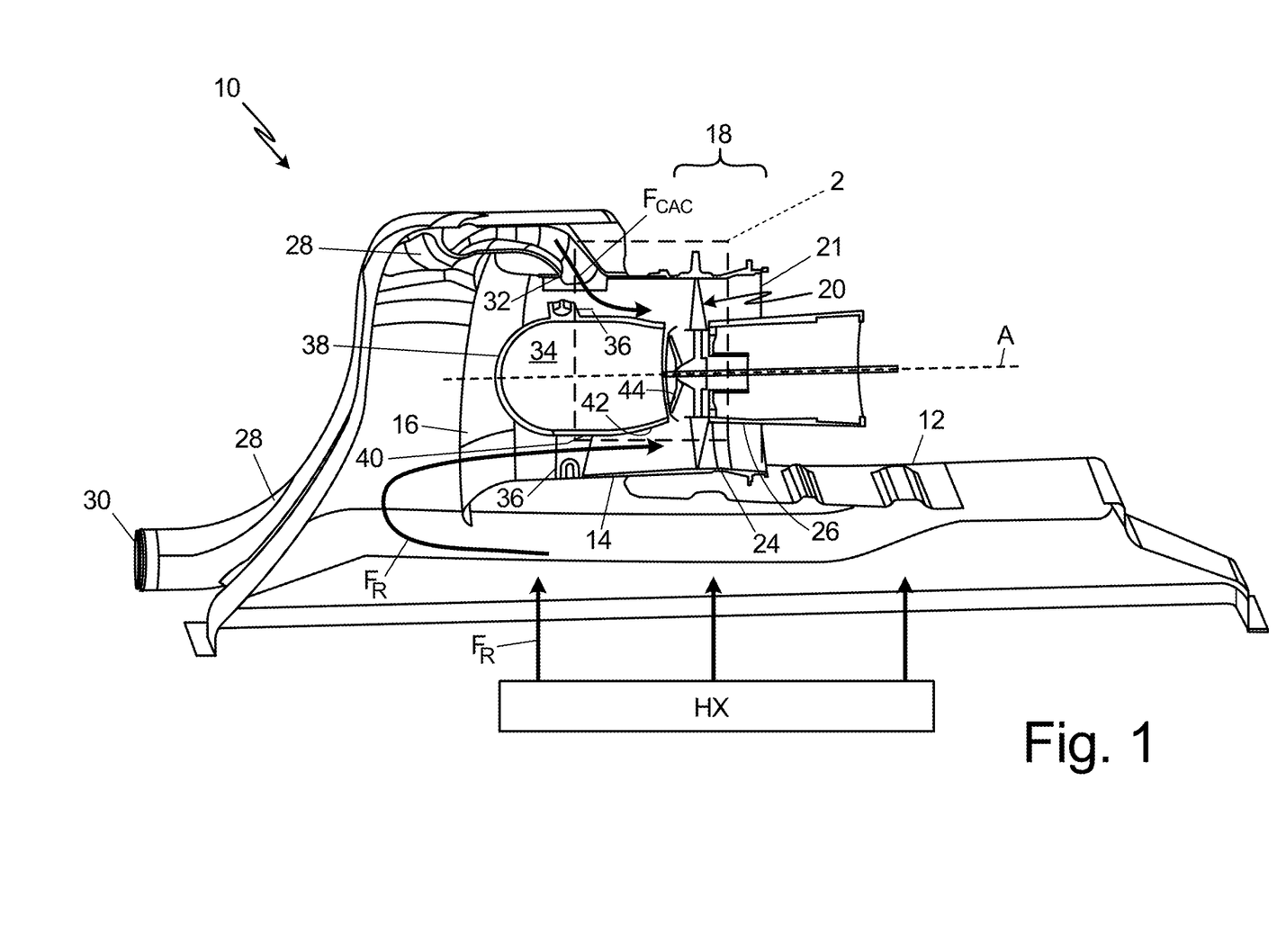
FIG. 1 is a cross-sectional view of a ram air fan inlet with cabin air compressor motor cooling enhancement.
Figure 2:
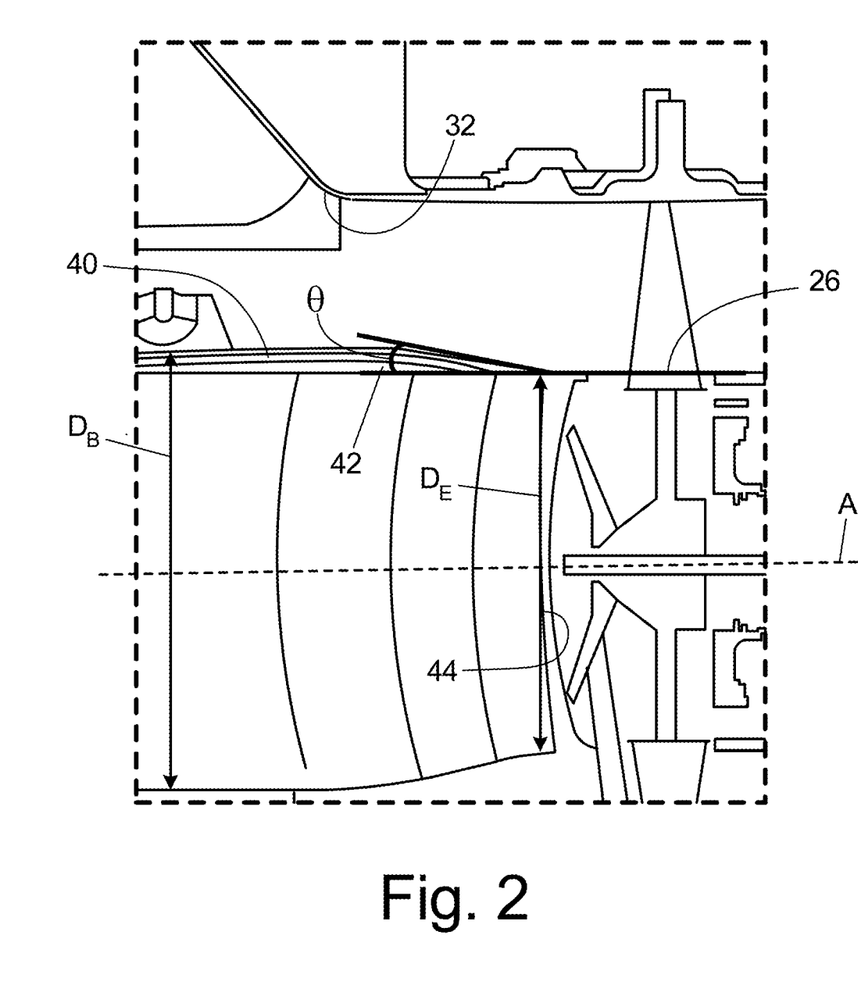
FIG. 2 is an enlarged view of section 2 of FIG. 1.

FIG. 1 is a cross-sectional view of ram air fan inlet assembly 10 with cabin air compressor motor cooling enhancement. FIG. 2 is an enlarged view of section 2 of FIG. 1. FIGS. 1 and 2 are discussed together. Assembly 10, ram air outlet header 12, ram air duct 14, ram air duct inlet 16, fan section 18, ram air fan 20, fan inlet 22, outer casing 24, inner casing 26, cabin air compressor (CAC) motor cooling return duct 28, CAC return duct inlet 30, CAC return duct outlet 32, centerbody 34, struts 36, upstream portion 38, body portion 40, downstream portion 42, downstream end 44, ram air fluid flow $F_R$, CAC motor cooling return fluid flow $F_{CAC}$, axis A, and heat exchanger HX are shown. Ram air outlet header 12 includes ram air duct 14 and ram air duct inlet 16. Ram air duct 14 is coupled to fan section 18. Fan section 18 is disposed immediately downstream and abutting the ram air duct 14. Fan section 18 includes ram air fan 20, stator 21, fan inlet 22, outer casing 24, and inner casing 26. CAC motor cooling return duct 28 includes CAC return duct inlet 30 and CAC return duct outlet 32. CAC return duct outlet 32 is provided through a wall of ram air duct 14 such that CAC motor cooling return duct 28 opens to ram air duct 14. Centerbody 34 is disposed in ram air duct 14 upstream of fan inlet 22. Centerbody 34 includes upstream portion 38, body portion 40, downstream portion, and downstream end 44. Ram air duct 14 and fan section 18 share common axis A. Centerbody 34 is disposed about axis A. A gas path is defined by a ram air duct 14 and fan section 18. A radially outer flow path is defined by ram air duct 14 and outer casing 24 of fan section 18. A radially inner flow path of fan section 18 is defined by inner casing 26. Inner casing 26 provides the innermost radial extent of fan inlet 22. Ram air fluid flow $F_R$ enters ram air duct 14 at ram air duct inlet 16. CAC motor cooling return fluid flow $F_{CAC}$ enters ram air duct 14 at CAC return duct outlet 32. Ram air fluid flow $F_R$ and CAC motor cooling return fluid flow $F_{CAC}$ enter fan inlet 22.

Ram air fan inlet assembly 10 is configured to enhance a CAC motor cooling by increasing a mass flow rate of a CAC cooling air to a CAC motor while maintaining RAM flow and fan performance. One or more CACs (not shown) can be used for aircraft cabin air conditioning. The CAC draws air from the atmosphere through a compressor impeller, which can be driven by an electric motor. A portion of CAC inlet air can be used for cooling motor windings. The CAC motor cooling air is drawn by ram air fan inlet assembly 10 with CAC motor cooling return fluid flow $F_{CAC}$ delivered to ram air duct 14 via CAC motor cooling return duct 28. A pressure differential between the CAC inlet (not shown) and CAC return duct outlet 32 drives the cooling flow to the CAC motor. A higher pressure differential increases the mass flow rate through the CAC motor and provides more effective cooling. Ram air fan inlet assembly 10 is configured reduce a static pressure at CAC return duct outlet 32 to increase a mass flow rate through the CAC motor. This reduction in pressure is achieved by reducing a volume of ram air duct 14 and increasing a velocity of CAC motor cooling return fluid flow $F_{CAC}$ at CAC return duct outlet 32. The positioning of centerbody 34 in ram air duct 14 reduces an open volume of ram air duct 14 and acts as an ejector for CAC motor cooling return fluid flow $F_{CAC}$, reducing a static pressure at CAC return duct outlet 32 and increasing a velocity of CAC motor cooling return fluid flow $F_{CAC}$. Centerbody 34 additionally diffuses ram air fluid flow $F_R$ and provides a more uniform fluid flow to ram air fan 20 and may enhance ram air fluid flow $F_R$.

Ram air outlet header 12 receives ram air fluid flow $F_R$ from a heat exchanger assembly HX (shown schematically) and CAC motor cooling return fluid flow $F_{CAC}$ from CAC return duct outlet 32. Ram air fluid flow $F_R$ and CAC motor cooling return fluid flow $F_{CAC}$ are driven by ram air fan 20. Ram air fan 20 can be driven by a motor (not shown).

Ram air outlet header 12 includes ram air duct 14, which receives ram air fluid flow $F_R$ from heat exchanger assembly HX. Ram air duct 14 can be substantially cylindrical. Ram air fluid flow $F_R$ enters ram air duct 14 at ram air duct inlet 16. Ram air duct inlet 16 can be defined by a bellmouth. At least a portion of ram air fluid flow $F_R$ received from heat exchanger assembly HX can flow along an exterior surface of ram air duct 14, curve, and change direction to enter ram air duct inlet 16 as shown in FIG. 1.

CAC motor cooling return duct 28 can be disposed adjacent to ram air outlet header 12. A portion of CAC motor cooling return duct 28 can be defined by ram air outlet header 12. For example, a portion of CAC motor cooling return duct 28 can be disposed inside ram air outlet header 12. Ram air outlet header 12 can form a wall of CAC motor cooling return duct 28. CAC motor cooling return duct 28 extends from CAC return duct inlet 30 to CAC return duct outlet 32. CAC return duct inlet 30 is configured to be coupled to a CAC system and to receive CAC motor cooling return fluid flow $F_{CAC}$. CAC motor cooling return duct 28 can extend up a side wall of ram air outlet header between CAC return duct inlet 30 and CAC return duct outlet 32 as shown. CAC motor cooling return duct 28 can have any shape or configuration to provide effective fluid flow.

CAC motor cooling return duct 28 opens to ram air duct 14 at CAC return duct outlet 32. CAC return duct outlet 32 is provided through a wall of ram air duct 14 opposite heat exchanger assembly HX. CAC return duct outlet 32 can be approximately centrally located between ram air duct inlet 16 and fan section 18 as shown. Walls of CAC motor cooling return duct 28 can be angled or shaped to direct CAC motor cooling return fluid flow $F_{CAC}$ through CAC return duct outlet 32 toward fan inlet 22.

Fan section 18 includes ram air fan 20, fan inlet 22, outer casing 24, and inner casing 26. Fan section 18 is disposed immediately downstream of ram air duct 14. Outer casing 24 of fan section 18 is coupled to ram air duct 14. Together, outer casing 24 and ram air duct 14 define an outer boundary of the gas path. Inner casing 26 defines an inner boundary of a gas path through fan section 18.

Centerbody 34 is disposed in ram air duct 14 upstream of and adjacent to fan inlet 22. Centerbody 34 is disposed radially inward of CAC return duct outlet 32. Centerbody 34 is a stationary bluff body configured to reduce of volume of the gas flow path in ram air duct 14 to improve CAC motor cooling. Centerbody 34 acts as an ejector for CAC motor cooling return fluid flow $F_{CAC}$. The velocity of CAC motor cooling return fluid flow $F_{CAC}$ increases as the volume in ram air duct 14 at CAC return duct outlet 32 is reduced. The increased flow velocity reduces the static pressure at CAC return duct outlet 32, which increases the mass flow rate of cooling fluid to the CAC motor and thereby enhances CAC motor cooling. Centerbody 34 helps improves ram flow and reduce loss. In addition, the shape (e.g., hemispherical) of upstream portion 38 of centerbody 34 helps elbow turn of ram flow near ram air duct inlet 16.

Centerbody 34 can be disposed immediately upstream of fan inlet 22 but spaced from fan inlet 22 to allow rotation of fan 22. Centerbody 34 is disposed on axis A. CAC return duct outlet 32 and centerbody 34 axially overlap. CAC return duct outlet 32 can axially overlap a subset of centerbody 34. In some embodiments, CAC return duct outlet 32 can be positioned radially outward of a portion of centerbody 34 having a greatest radial extent (i.e., a portion where centerbody 34 is located closest to the interior wall of ram air duct 14, as described further herein).

Centerbody 34 has upstream portion 38, body portion 40, downstream portion 42, and downstream end 44. Upstream portion 38 can form an upstream most axial extent of centerbody 34. Downstream end 44 is provided at a downstream most axial extent of centerbody 34. Body portion 40 is disposed between upstream portion 38 and downstream portion 42.

Downstream end 44 is cylindrical. Downstream end 44 can have a diameter $D_E$ substantially equal to a diameter of inner casing 26 of ram air fan 20. Downstream end 44 can be substantially radially aligned with inner casing 26 to form an innermost radial extent of the gas path in ram air duct 14 that substantially matches the innermost radially extent of fan inlet 22 (i.e., inner casing 26).

Upstream portion 38 can be shaped to optimize ram air fluid flow $F_M$ adjacent ram air duct inlet 16 and toward fan inlet 22. Upstream portion 38 can have a converging surface. For example, upstream portion 38 can have a curved or hemispherical surface as shown in FIG. 1. Upstream portion 38 can have other shapes, configurations, and features as described further herein. For example, upstream portion 38 can be asymmetrical with respect to axis A.

Body portion 40 is disposed between upstream portion and downstream portion 42. Body portion 40 can be substantially cylindrical. Body portion 40 can have a diameter $D_B$ that is greater than a diameter $D_E$ of downstream end 44. As such, body portion 40 can be located closer to the interior walls of ram air duct 14 than downstream end 44. Body portion 40 can axially overlap CAC return duct outlet 32. A radial extent of centerbody 34 can be greatest in body portion 40 (i.e., a diameter of centerbody 34 can be greatest in body portion 40) to locally reduce a gas path volume adjacent to CAC return duct outlet 32 to increase the velocity of CAC motor cooling fluid flow $F_{CAC}$. Walls of centerbody 34 can converge from body portion 40 to downstream end 44 over downstream portion 42. Diameter $D_B$ of body portion 40 can be selected to optimize a volume reduction of ram air duct 14 while maintaining effective fluid flow through ram air duct 14. For example, diameter $D_B$ and an axial position of body portion 40 can be selected to provide walls of centerbody 34 that converge over downstream portion 42 (from cylindrical body portion 40 to downstream end 44) at an angle θ of less than 14 degrees relative to inner casing 26 (innermost radial extent of fan inlet 22) to avoid stall or separation of fluid flow along centerbody 34 (shown in FIG. 2). In some embodiments, angle θ may be greater than 14 degrees if shown to avoid stall. Downstream portion 42 can axially overlap a subset of CAC return duct outlet 32 or can be positioned axially aft of CAC return duct outlet 32.

Centerbody 34 can be axisymmetric as illustrated in FIG. 1. In other embodiments, centerbody 34 can have an asymmetric shape with one or more portions of centerbody 34 skewed toward CAC return duct outlet 32 or positioned closer to CAC return duct outlet 32 to further reduce a gas path volume in ram air duct 14 adjacent to CAC return duct outlet 32. As previously discussed, centerbody 34 can act as an ejector, increasing the velocity of CAC motor cooling return fluid flow $F_{CAC}$. In some embodiments, it may be beneficial to locally reduce the gas path volume adjacent to CAC return duct outlet 32 while maintaining or increasing a gas path volume in other locations around centerbody 34. A local reduction in gas path volume adjacent to CAC return duct outlet 32 can be provided to further reduce the static pressure at CAC return duct outlet 32 and thereby further enhance CAC motor cooling. Other portions of centerbody 34 can be configured to optimize ram air fluid flow $F_R$.

Centerbody 34 can have an axial extent provided to optimize volume reduction of ram air duct 14 while maintaining effective ram air fluid flow $F_M$ through ram air duct 14. The axial extent of centerbody 34 is defined as the distance between an upstream most axial extent of upstream portion 38 and downstream end 44. Centerbody 34 can have an axial extent greater than 50 percent of an axial extent of ram air duct 14. The axial extent of ram air duct 14 is defined as the axial distance between ram air duct inlet 16 and fan section 18. In some examples centerbody 34 can have an axial extent greater than 75 percent of the axial extent of ram air duct 14.

Centerbody 34 can be secured to ram air duct 14 by a plurality of struts 36. Struts 36 can extend from an outer surface of centerbody 34 to an interior surface of ram air duct 14. Struts 36 can be integrally formed with centerbody 34 or fastened to centerbody 34 by various means known in the art. Struts 36 and centerbody 34 can be formed from the same or different materials, including for example, composite materials (e.g., carbon fiber) or metal. Struts 36 can be fastened to ram air duct 14 by fasteners, such as bolts, screws, rivets, and the like. Struts 36 can be spaced about an outer wall of centerbody 34 in any configuration suitable for securing centerbody 34 while limiting any negative impact struts 36 may have on fluid flow through ram air duct 14. Any number of struts 36 capable of maintaining a position of centerbody 34 in ram air duct 14 can be used. The number of struts 36, shape of struts 36, and axial position of struts 36 can be selected to promote effective fluid flow through ram air duct 14. Generally, a minimal number of struts can be desired to reduce any negative impact on fluid flow through ram air duct 14. Similarly, a shape and/or size of struts can be designed to minimize fluid flow disruption by struts 36. For example, struts 36 can be formed of a thin material (e.g., sheet metal) or strong, small-diameter rods. In some examples, struts 36 can have an airfoil shape. Struts 36 can axially overlap CAC return duct outlet 32 or can be positioned axially upstream of CAC return duct outlet 32. CAC return duct outlet 32 can be positioned between adjacent struts 36 such that struts 36 do not interrupt CAC motor cooling return fluid flow $F_{CAC}$ from CAC return duct outlet 32. For example, struts 36 can be offset from CAC return duct outlet 32 in a circumferential direction along the interior wall of ram air duct 14. It will be understood by one of ordinary skill in the art that the configuration of struts 36 can be optimized to secure centerbody 34 in ram air duct 14 while minimizing any adverse effects struts 36 may have on fluid flow through ram air duct 14. The shape and configuration of struts 36 are not limited to those shown in FIG. 1.

Example 1

Analysis of a ram air fan inlet assembly was conducted for a ram air fan inlet assembly with a centerbody having configured as illustrated in FIG. 1. A body portion diameter $D_B$ of the centerbody was 6.2 inches. The centerbody extended an axial length of 10 inches. The ram air duct had a diameter of approximately 13 inches and axial length of approximately 14 inches. Analysis conducted with computational fluid dynamics (CFD) indicated a 100 percent increase in a pressure difference across the CAC motor cooling assembly, defined as the CAC flow inlet total pressure at CAC return duct inlet 30 minus the static pressure at CAC return duct outlet 32. This increase in pressure difference leads to a 40% increase in CAC motor mass cooling flow. Actual cooling flow increase depends on CAC system losses upstream of CAC return duct inlet 30. CFD showed a small beneficial improvement of ram air fluid flow.

Example 2

The centerbody of Example 1 was replaced with a centerbody having a body portion diameter $D_B$ of 7.7 inches. The axial length remained the same. CFD analysis indicated a factor of three pressure difference increase from CAC return duct inlet 30 to CAC return duct 32, leading to 90% cooling flow increase. Actual cooling flow increase depends on CAC system losses upstream of CAC inlet 30. Further analysis indicated minimum impact on the ram air fan and a fan stator. A small beneficial improvement of ram air fluid flow was shown.

Figure 3:
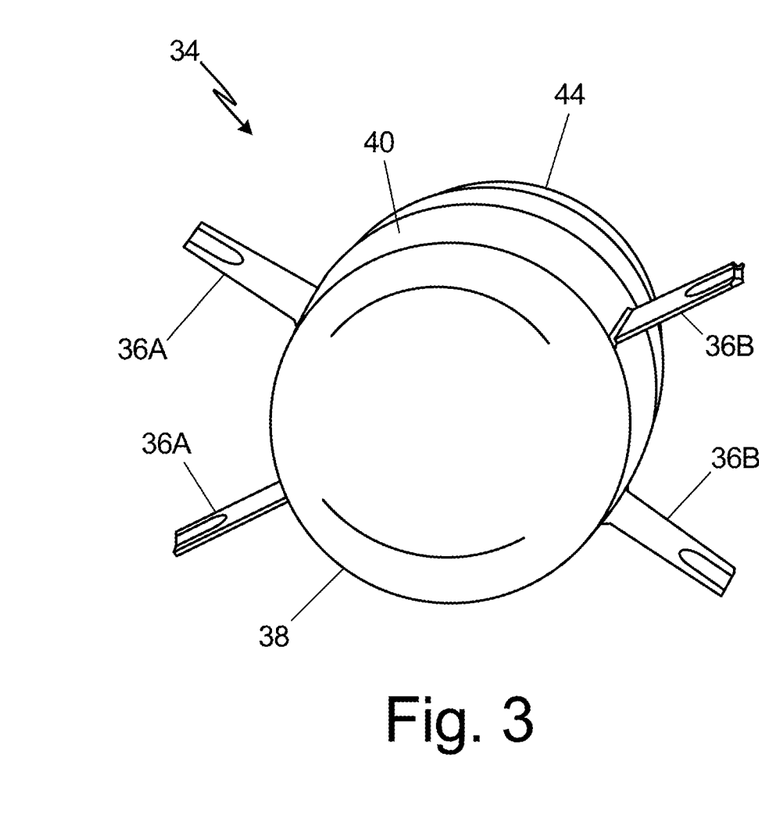
FIG. 3 is a perspective front view of one example of a centerbody for use in the ram air fan inlet assembly of FIG. 1.
Figure 4:
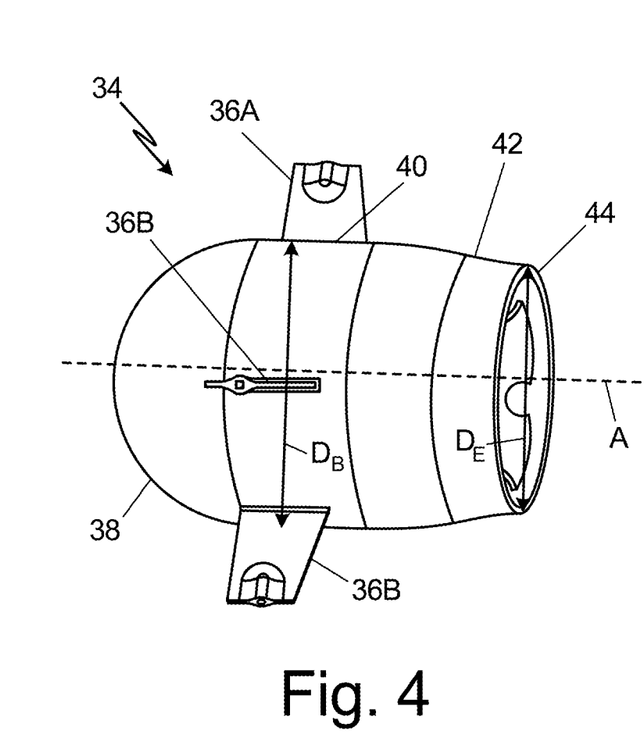
FIG. 4 is a perspective side view of the centerbody of FIG. 3.

FIG. 3 is a perspective front view of centerbody 34 of FIG. 1. FIG. 4 is a perspective side view of centerbody 34. FIGS. 3 and 4 are discussed together. Centerbody 34 is one example of a centerbody configured for use in a ram air fan inlet assembly. Other centerbody shapes and configurations are contemplated. Upstream portion 38, body portion 40, downstream portion 42, downstream end 44, struts 36, axis A, diameter $D_B$, and diameter $D_E$ are shown. Centerbody 34 can be axisymmetric with respect to axis A. Upstream portion 38 can have a curved or hemispherical surface protruding upstream from body portion 40. Body portion 40 can be substantially cylindrical having a diameter $D_B$. A radial extent of centerbody 34 can be greatest in body portion 40 (i.e., a diameter of centerbody 34 can be greatest in body portion 40). Walls of centerbody 34 can converge along downstream portion 42 from body portion 40 to downstream end 44. Downstream end 44 is located opposite upstream portion 38 and at the downstream most axial extent of centerbody 34. Downstream end 44 is cylindrical. The axial extent of each of body portion 40 and 42 can selected to optimize CAC motor cooling fluid flow $F_{CAC}$ and ram air flow $F_R$.

Struts 36 extend radially from centerbody 34. Struts 36 can be disposed on body portion 40. Centerbody 34 can include four struts 36 as shows. Other embodiments can include fewer or more struts. Struts 36 can be spaced to accommodate CAC motor cooling return fluid flow $F_{CAC}$. For example, pairs of struts 36A and 36B can be disposed on opposite sides of centerbody 34. Struts 36A and 36B within each pair 36A and 36B can be spaced closer together than pairs of struts 36A and 36B to provide a larger circumferential opening between struts 36A and 36B at a surface of centerbody 34 corresponding with the location of CAC return duct outlet 32 of FIG. 1.

Figure 5:
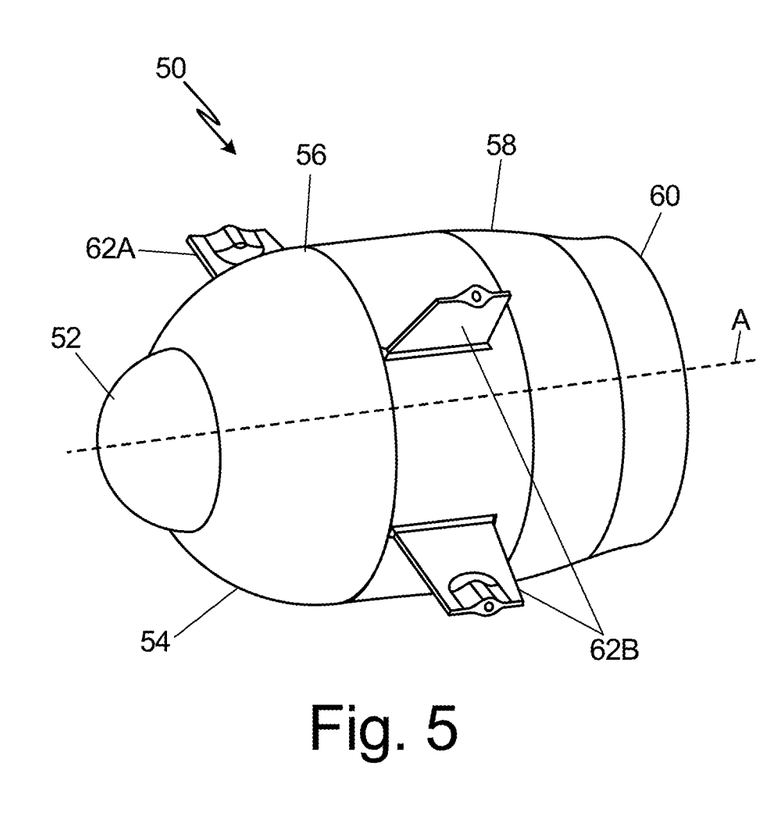
FIG. 5 is a perspective view of another example of a centerbody for use in the ram air fan inlet assembly of FIG. 1.

FIG. 5 is a perspective view of another example of a centerbody for use in the ram air fan inlet assembly of FIG. 1. FIG. 5 shows centerbody 50. Centerbody 50 is substantially the same as centerbody 34 shown in FIGS. 3 and 4 and described with respect thereto with the exception that centerbody 50 includes nose 52. Nose 52 further improves the flow and reduces loss after ram air inlet 16. Centerbody 50, nose 52, upstream portion 54, body portion 56, downstream portion 58, downstream end 60, struts 62A and 62B, and axis A are shown.

Nose 52 forms the upstream most axial extent of upstream portion 54. Nose 52 can be axisymmetric and disposed on axis A. Nose 52 can have a converging surface to promote ram air outlet fluid flow $F_R$ across centerbody 50. For example, nose 52 can have a curved or hemispherical surface. Nose 52 can be disposed on a larger curved or hemispherical surface of upstream portion 54 such that upstream portion 54 is defined by two concentric curved or hemispherical surfaces of differing sizes.

Figure 6:
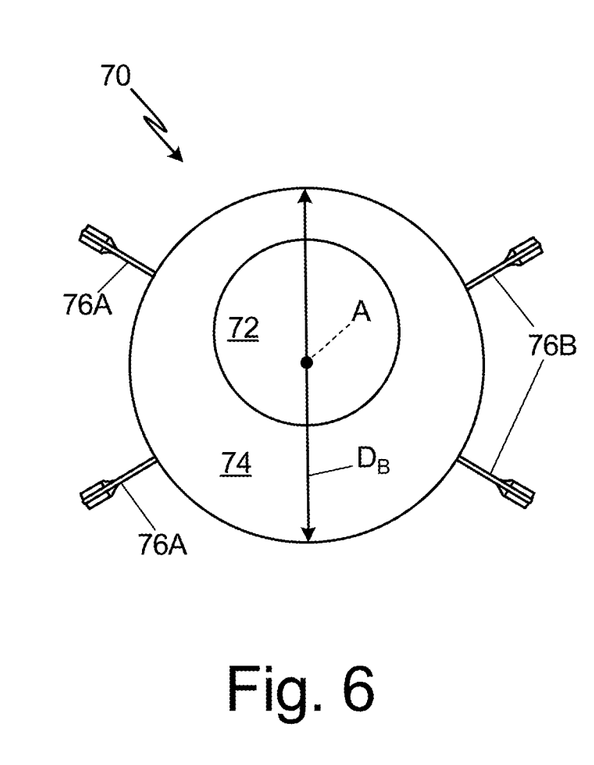
FIG. 6 is a front view of another example of a centerbody for use in the ram air fan inlet assembly of FIG. 1.

FIG. 6 is a front view of another example of a centerbody for use in the ram air fan inlet assembly of FIG. 1. FIG. 6 shows centerbody 70. Centerbody 70 is substantially the same as centerbody 50 shown in FIG. 5 and described with respect thereto with the exception that centerbody 70 includes nose 72, which is skewed toward a portion of centerbody 70 corresponding to a location of CAC return duct outlet 32 of FIG. 1. Centerbody 70, nose 72, upstream portion 74, struts 76A and 76B, axis A, and diameter $D_B$ are shown.

Nose 72 can have a shape substantially the same as nose 52 shown in FIG. 5 to promote ram air outlet fluid flow $F_R$ across centerbody 70. For example, nose 70 can have a curved or hemispherical shape. Nose 70 can be disposed on a larger curved or hemispherical surface of upstream portion 74 such that upstream portion 74 is defined by two eccentric curved or hemispherical surfaces of differing sizes. Nose 70 can be radially offset from axis A toward a surface of centerbody 70 corresponding with a location of CAC return duct outlet 32 when positioned in a ram air inlet assembly as illustrated in FIG. 1. Nose 70 can be provided to further reduce a volume the gas path adjacent to CAC return duct outlet 32 to increase the velocity of CAC motor cooling return fluid flow $F_{CAC}$ and thereby reduce the static pressure at CAC return duct outlet 32.

The centerbodies disclosed herein for use in a ram air fan inlet assembly to enhance a CAC motor cooling are not limited to the embodiments shown. As previously discussed, centerbodies can have complex shapes designed to optimize CAC motor cooling while having minimum impact or beneficial impact on ram air flow.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A ram air fan inlet assembly for cabin air compressor (CAC) motor cooling flow enhancement includes a gas path defined by a ram air duct and a fan section, a CAC motor cooling return duct having an outlet provided through a wall of the ram air duct, and a centerbody disposed in the ram air duct and axially overlapping the outlet. The fan section is immediately downstream and abutting the ram air duct. The ram air duct and the fan section share a common axis. The centerbody is disposed about the common axis and configured to reduce of volume of the gas flow path in the ram air duct.

The ram air fan inlet assembly of the preceding paragraph can optionally include, additionally and/or alternatively, any one or more of the following features, configurations and/or additional components:

In an embodiment of the foregoing ram air fan inlet assembly, the centerbody can be secured to the ram air duct.

In an embodiment of any of the foregoing ram air fan inlet assemblies, the centerbody can be secured to the ram air duct by a plurality of struts.

In an embodiment of any of the foregoing ram air fan inlet assemblies, the outlet can be disposed between adjacent struts.

In an embodiment of any of the foregoing ram air fan inlet assemblies, the outlet can axially overlap a subset of the centerbody.

In an embodiment of any of the foregoing ram air fan inlet assemblies, the centerbody can include an upstream portion having a converging surface, a cylindrical body portion, and a cylindrical downstream end disposed at a downstream most axial extent of the centerbody. The walls of the centerbody can converge from the cylindrical body portion to the cylindrical downstream end.

In an embodiment of any of the foregoing ram air fan inlet assemblies, the downstream end can be radially aligned with an innermost radial extent of an inlet of the fan section.

In an embodiment of any of the foregoing ram air fan inlet assemblies, walls of the centerbody can converge from the cylindrical body portion to the cylindrical downstream end at an angle of less than 14 degrees relative to the innermost radial extent of the inlet of the fan section.

In an embodiment of any of the foregoing ram air fan inlet assemblies, the upstream portion can include a nose disposed on and protruding upstream from the converging surface.

In an embodiment of any of the foregoing ram air fan inlet assemblies, the centerbody can be axisymmetric.

In an embodiment of any of the foregoing ram air fan inlet assemblies, the nose can have a spherical surface.

In an embodiment of any of the foregoing ram air fan inlet assemblies, the nose can be radially offset from a center of the converging surface toward the outlet.

In an embodiment of any of the foregoing ram air fan inlet assemblies, the centerbody can extend axially from the cylindrical downstream end to a position greater than 50 percent of an axial extent of the ram air duct.

In an embodiment of any of the foregoing ram air fan inlet assemblies, the ram air fan duct can have a bellmouth inlet.

A method of enhancing cabin air compressor (CAC) motor cooling fluid flow in an aircraft includes positioning a centerbody in a ram air duct to reduce a of volume of a gas flow path in the ram air duct and providing an outlet of a CAC motor cooling return duct through a wall of the ram air duct. The ram air duct abuts and is immediately upstream of a fan section, and the centerbody, ram air duct, and fan section are disposed about a common axis. The centerbody and the outlet axially overlap.

The method of the preceding paragraph can optionally include, additionally and/or alternatively, any one or more of the following features, configurations, additional components, and/or steps:

In an embodiment of the foregoing method, the centerbody can include an upstream portion having a converging surface, a cylindrical body portion, and a cylindrical downstream end disposed at a downstream most axial extent of the centerbody. The walls of the centerbody can converge from the cylindrical body portion to the cylindrical downstream end.

In an embodiment of any of the foregoing methods, the downstream end can be radially aligned with an innermost radial extent of an inlet of the fan section.

In an embodiment of any of the foregoing methods, the centerbody can extend axially from the cylindrical downstream end to a position greater than 50 percent of an axial extent of the ram air duct.

In an embodiment of any of the foregoing methods, the centerbody can be secured to the ram air duct by a plurality of struts and the outlet can be disposed between adjacent struts.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A ram air fan inlet assembly for cabin air compressor (CAC) motor cooling flow enhancement, the ram air fan inlet assembly comprising:
    a gas path defined by a ram air duct and a fan section, the fan section immediately downstream and abutting the ram air duct, wherein the ram air duct and the fan section share a common axis;
    a CAC motor cooling return duct having an outlet in the ram air duct, wherein the outlet is an opening in a wall of the ram air duct and the opening opens directly to the ram air duct; and
    a stationary centerbody disposed in the ram air duct about the common axis and configured to reduce a volume of the gas flow path in the ram air duct, wherein the centerbody and the outlet axially overlap.

2. The ram air fan inlet assembly of claim 1, wherein the centerbody is secured to the ram air duct.

3. The ram air fan inlet assembly of claim 2, wherein the centerbody is secured to the ram air duct by a plurality of struts.

4. The ram air fan inlet assembly of claim 3, wherein the outlet is disposed between adjacent struts.

5. The ram air fan inlet assembly of claim 1, wherein the outlet axially overlaps a subset of the centerbody.

6. The ram air fan inlet assembly of claim 1, wherein the centerbody comprises:
    an upstream portion having a converging surface;
    a downstream portion; and
    a cylindrical downstream end disposed at a downstream most axial extent of the centerbody, wherein the downstream end is radially aligned with an innermost radial extent of an inlet of the fan section;
    wherein walls of the centerbody converge in the downstream portion to the cylindrical downstream end.

7. The ram air fan inlet assembly of claim 6, wherein walls of the centerbody converge from the cylindrical body portion to the cylindrical downstream end at an angle of less than 14 degrees relative to the innermost radial extent of the inlet of the fan section.

8. The ram air fan inlet assembly of claim 6, wherein the upstream portion includes a nose disposed on and protruding upstream from the converging surface.

9. The ram air fan inlet assembly of claim 8, wherein the centerbody is axisymmetric.

10. The ram air fan inlet assembly of claim 9, wherein the nose has a spherical surface.

11. The ram air fan inlet assembly of claim 8, wherein the nose is radially offset from a center of the converging surface toward the outlet.

12. The ram air fan inlet assembly of claim 6, wherein the centerbody extends axially from the cylindrical downstream end to a position greater than 50 percent of an axial extent of the ram air duct.

13. The ram air fan inlet assembly of claim 12, wherein the ram air fan duct has a bellmouth inlet.

14. The ram air fan inlet assembly of claim 6, wherein the centerbody further comprises a cylindrical body portion connecting the upstream portion and the downstream portion.

15. A method of enhancing cabin air compressor (CAC) motor cooling fluid flow in an aircraft, the method comprising:
    positioning a stationary centerbody in a ram air duct to reduce a volume of a gas flow path in the ram air duct; and
    providing an outlet of a CAC motor cooling return duct through a wall of the ram air duct, wherein the outlet is an opening in the wall of the ram air duct and the opening opens directly to the ram air duct;
    wherein the ram air duct abuts and is immediately upstream of a fan section, the centerbody, ram air duct, and fan section disposed about a common axis; and
    wherein the centerbody and the outlet axially overlap.

16. The method of claim 15, wherein the centerbody comprises:
    an upstream portion having a converging surface;
    a downstream portion; and
    a cylindrical downstream end disposed at a downstream most axial extent of the centerbody, wherein the downstream end is radially aligned with an innermost radial extent of an inlet of the fan section;
    wherein walls of the centerbody converge in the downstream portion to the cylindrical downstream end.

17. The method of claim 16, wherein the centerbody extends axially from the cylindrical downstream end to a position greater than 50 percent of an axial extent of the ram air duct.

18. The method of claim 15, wherein the centerbody is secured to the ram air duct by a plurality of struts, and wherein the outlet is disposed between adjacent struts.

19. The method of claim 16, wherein the centerbody further comprises a cylindrical body portion connecting the upstream portion and the downstream portion.

\* \* \* \* \*